Oct. 16, 1945.  F. FELIX ET AL  2,387,062

DYNAMOELECTRIC MACHINE

Filed June 1, 1944

Inventors:
Fremont Felix,
Adolph C. Hugin,
by Harry E. Dunham
Their Attorney.

Patented Oct. 16, 1945

2,387,062

UNITED STATES PATENT OFFICE 2,387,062

DYNAMOELECTRIC MACHINE

Fremont Felix and Adolph C. Hugin, Schenectady, N. Y., assignors to General Electric Company, a corporation of New York Application June 1, 1944, Serial No. 538,250

8 Claims. (Cl. 171—223)

Our invention relates to direct current commutator type dynamoelectric machines and particularly to a generator having an excitation system for providing the machine with a maximum limiting voltage.

An object of our invention is to provide an improved dynamoelectric machine with means for limiting the maximum voltage thereof to a substantially predetermined value.

Another object of our invention is to provide an armature reaction excited dynamoelectric machine with means for limiting the maximum voltage thereof to a substantially predetermined value.

Further objects and advantages of our invention will become apparent and our invention will be better understood from the following description referring to the accompanying drawing, and the features of novelty which characterize our invention will be pointed out with particularity in the claims annexed to and forming part of this specification.

Figure 1:
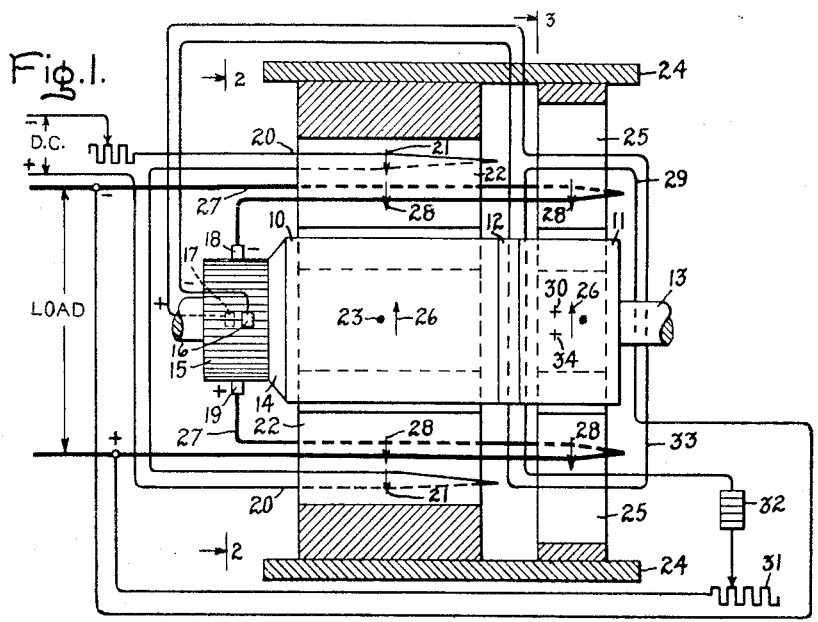
Figure 2:
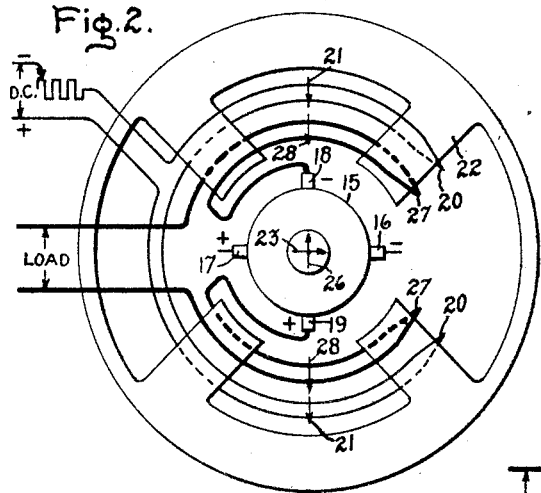
Figure 3:
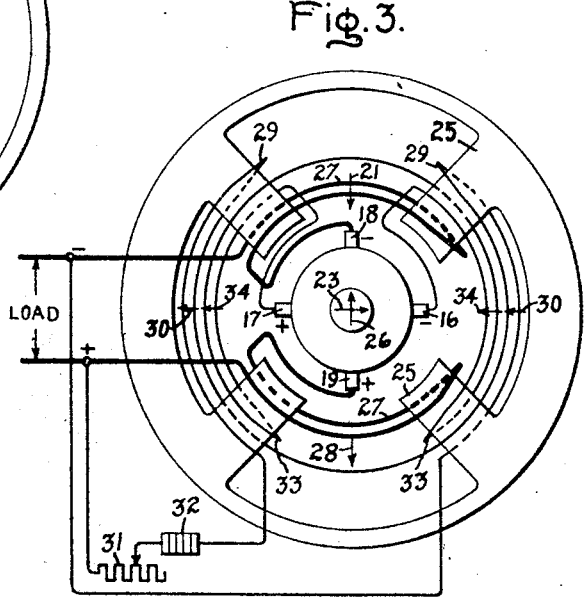
Figure 4:
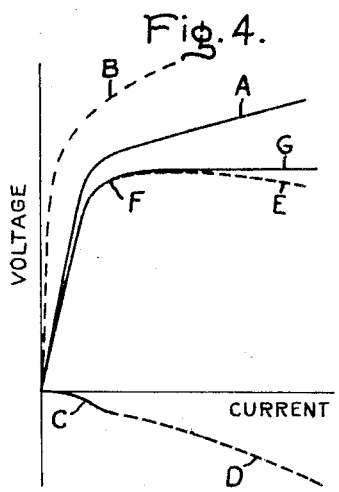

In the drawing, Fig. 1 is a schematic side elevational view of a dynamoelectric machine provided with an embodiment of our invention; Fig. 2 is a schematic view of the machine shown in Fig. 1 illustrating the left-hand portion of the machine as viewed along line 2—2; Fig. 3 is a schematic view of the machine shown in Fig. 1 illustrating the right-hand portion of the machine as viewed along line 3—3; and Fig. 4 illustrates characteristics of the machine shown in the other figures.

Referring to the drawing, we have shown in Figs. 1, 2, and 3 an armature reaction excited dynamoelectric machine of the type described in Patent 2,227,992, Alexanderson and Edwards, January 7, 1941, provided with a rotatable member or armature having a core of magnetic material formed as two magnetically substantially separate sections 10 and 11 separated by a non-magnetic separator element 12. These core sections are mounted upon a shaft 13 and may be separated from this shaft by a sleeve or a bushing of non-magnetic material in order to assure the magnetic separation of the two core sections 10 and 11. This armature is of the conventional direct current type provided with a winding 14 in both sections of the core electrically connected to the segments of a commutator 15 and adapted to be driven by any suitable source of mechanical power.

In dynamoelectric machines of the armature reaction excited type, a set of primary or quadrature brushes is arranged to provide substantially a short circuit through the armatures. In the illustrated arrangement, a set of primary brushes 16 and 17 is arranged in contact with the commutator 15 to provide a substantially short-circuited primary circuit through the armature by an external circuit including a field exciting winding, and a set of secondary or load brushes 18 and 19 is arranged in contact with the commutator 15 and displaced thereabout substantially 90 electrical degrees from the primary brushes 16 and 17 to provide a secondary circuit through the armature which is adapted to be connected to the load on the machine.

In order to control the secondary or load characteristics of the generator, a control field exciting winding 20 is arranged to provide a resultant component of magnetic excitation along the secondary commutating axis of the machine as indicated by the arrow 21 and is arranged about a core pole section 22 of the stationary member over the rotatable member core section 10 to provide magnetic poles over the rotatable member core section 10. The excitation which is provided by the control field exciting winding 20 induces an electromotive force in the armature winding between the primary brushes 16 and 17 which causes a current to flow through the armature primary short circuit and produces a component of primary armature reaction excitation indicated by the arrow 23. This primary armature reaction 23 will be produced in both core sections 10 and 11 of the armature, and this component of excitation in the rotatable member core section 10 is completed through the stationary core section pole pieces 22 which are supported in a stationary member frame 24, preferably of non-magnetic material or of magnetic material of relatively small section, which also supports other stationary member core section pole pieces 25 to provide substantially magnetically separate sets of pole pieces 22 and 25 for the stationary member of the machine. Rotation of the armature in the field of the primary armature reaction 23 induces an electromotive force between the secondary or load brushes 18 and 19 such that the excitation provided by the control field exciting winding 20 produces and controls a component of voltage in the rotatable member winding 14 between the load brushes 18 and 19. When these brushes are connected to a load, an electric current will flow through the armature circuit and will produce a secondary component of armature reaction, as indicated by the arrow 26, which is opposed to the control component of excitation 21. The sensitivity of the control field exciting winding 20 in this type machine is increased by substantially neutralizing the secondary component of armature reaction 26 by providing a secondary or load compensating field exciting winding 27 arranged about the stationary pole pieces 22 and connecting this field exciting winding in the secondary or load circuit of the armature to provide a resultant component of excitation, as indicated by the arrows 28, substantially equal and opposite to the secondary component of armature reaction 26 substantially to neutralize this component of armature reaction. With this arrangement, the excitation provided to the armature winding 14 by the stationary pole pieces 22 produces a voltage characteristic as indicated by the curve A in Fig. 4. This is the conventional type saturation curve for a D. C. generator.

Under certain conditions, it is desirable that the voltage of a generator should be limited to a predetermined maximum substantially constant value and various regulators have been used to provide this characteristic. In order to provide an inherent regulation to our improved machine which will limit the voltage of the machine substantially to a predetermined maximum and constant value, a differential field exciting winding 29 is arranged around pole pieces 25 of the stationary member to provide the required differential voltage in the armature winding 14. This field exciting winding is adapted to provide a resultant component of excitation, indicated by the arrows 30, to the section 11 of the rotatable member core which is adapted to induce a component of voltage in the rotatable member winding 14 in opposition to the component of voltage produced at the load brushes 18 and 19 by the excitation provided by the primary armature reaction 23 as controlled by the main control field exciting winding 20. The field exciting winding 29 is connected in series with a manually operable variable resistor 31 and a non-linear inverse voltage-resistance member 32 and across the secondary or load terminals of the machine. The resistance member 32 is formed of a material such as Thyrite which is described in Patent No. 1,822,742, McEachron, and of such dimensions to provide a characteristic which will have a relatively high substantially constant resistance for voltages up to a value corresponding to the "knee" of the saturation curve A and for higher voltages the resistance will decrease relatively rapidly. This provides the resistance member 32 with a voltage-current characteristic as shown by curve B in Fig. 4. The field exciting winding 29 is provided with such a number of turns that its energization by the current through the resistance member 32 will provide the excitation 30 to the armature winding in the armature core portion 11 to induce a voltage in this portion of the winding which is very small for all values of the voltage induced in the armature winding in the core portion 10 below the "knee" of the curve A as indicated by curve C, Fig. 4, and a rapidly increasing voltage beyond this point for equal increments of voltage. However, since the field exciting winding 29 is energized by the voltage of the load brushes 18 and 19, represented by curve A, this energizing voltage increases relatively slowly above the "knee" of curve A and the voltage induced in the armature winding 14 by the corresponding increase in current through the resistance member 32 and the field exciting winding 29 will provide an excitation to the armature winding in the core portion 11 which is substantially equal and opposite to any increase in the component of voltage at the load brushes produced by the field exciting winding 20 in the core portion 10. If the secondary or load armature voltage were to follow its saturation curve A, the field exciting winding 29 would induce a differential component of armature voltage for variations in the current of the main control field exciting winding 20 as shown by curve D in Fig. 4. This would provide a net secondary voltage which would be substantially constant above the "knee" of curve A, as shown by curve E in Fig. 4. However, since any slight increase in the secondary or load terminal voltage above the predetermined value indicated by point F results in a corresponding differential voltage in the armature winding in the core portion 11, the net armature secondary terminal voltage will remain substantially constant above point F, as indicated by curve G in Fig. 4 which is slightly higher than the theoretical curve E. This action of the differential field exciting winding 29 is possible only if it acts on a substantially unsaturated magnetic circuit free from the influences of armature reaction. This type magnetic circuit is provided by forming the stator core section 25 of sufficient size substantially to prevent saturation by the field exciting winding 29 and by also arranging the secondary compensating field exciting winding 27 around the stator core pole pieces 25 also substantially to neutralize the secondary component of armature reaction in this magnetic circuit, and by providing a primary compensating field exciting winding 33 arranged about the pole pieces 25. This field exciting winding 33 is connected across the armature primary brushes 16 and 17 and provides a component of excitation substantially equal and opposite to the component of primary armature reaction 23 in the pole pieces 25 and the armature core portion 11, as indicated in Figs. 1 and 3 by the arrows 34.

The resultant secondary or load voltage of the machine is represented by curve G in Fig. 4 and is substantially constant above the predetermined value indicated by the point F. Obviously, with this type arrangement, the characteristic could be permitted to increase slightly above the point F or could be made to drop beyond this point by properly proportioning the field exciting winding 29 and the resistance 32. Thus, we have provided an arrangement wherein the resultant load voltage of the armature winding 14 is limited to a maximum predetermined substantially constant value without the use of any external mechanical voltage regulating devices.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. A dynamoelectric machine including a stationary member and a rotatable member having a core of magnetic material, means including a nonmagnetic spacer in said core for dividing said core into a pair of substantially separate magnetic circuits, a winding in said rotatable member core, a commutator connected to said winding, load brushes for said commutator, means including a field exciting winding for providing a control component of excitation to substantially only one of said magnetic circuits for controlling the voltage of said machine, and means including a second field exciting winding arranged around the other of said core magnetic circuits for providing a component of excitation to substantially only the other of said magnetic circuits for inducing a component of voltage in said rotatable member winding variable with and substantially equal and opposite to the component of voltage produced at said load brushes by the excitation of said control field exciting winding above substantial saturation of said first-mentioned magnetic circuit for providing a substantially constant and predetermined maximum voltage to said machine above said saturation.

2. A dynamoelectric machine including a stationary member and a rotatable member having a core of magnetic material, means including a non-magnetic spacer in said core for dividing said core into a pair of magnetically substantially seperate sections, a winding in said rotatable member core, a commutator connected to said winding, load brushes for said commutator, means including a field exciting winding for providing a control component of excitation to one of said rotatable member sections for controlling the voltage of said machine, and means including a second field exciting winding energized by the voltage of said machine and connected in series with a non-linear inverse voltage-resistance characteristic resistance for providing a component of excitation to the other of said rotatable member sections for inducing a component of voltage in said rotatable member winding in opposition to the component of voltage produced at said load brushes by the excitation provided by said control field exciting winding to said one section for providing a substantially constant and predetermined maximum voltage to said machine above a predetermined value.

3. A dynamo electric machine including a stationary member and a rotatable member having a core of magnetic material, means including a non-magnetic spacer in said core for dividing said core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section with magnetically substantially separate stationary core sections over different of said rotatable member core sections, a control field exciting winding arranged to excite said stationary core section over one of said rotatable member core sections, means for substantially neutralizing secondary armature reaction in said control field stationary core section due to electric current in said rotatable member secondary circuit, and other field exciting means for providing a component of excitation to the other of said rotatable member sections for inducing a component of voltage in said rotatable member winding variable with and opposite to the component of voltage produced at said secondary brushes by the excitation of said control field exciting winding arranged to provide a substantially predetermined maximum voltage to said machine.

4. A dynamoelectric machine including a stationary member and a rotatable member having a core of magnetic material, means for dividing said rotatable member core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including exciting poles over each rotatable member core section, a control field exciting winding arranged to excite said stationary exciting poles over one of said rotatable member core sections, means for substantially neutralizing secondary armature reaction in said control stationary member poles due to electric current in said rotatable member secondary circuit, and means including a second field exciting winding energized by the voltage of said machine and connected in series with a non-linear inverse voltage-resistance characteristic resistance for providing a component of excitation to the other of said rotatable member sections for inducing a component of voltage in said rotatable member winding variable with and substantially equal and opposite to the component of voltage produced at said secondary brushes by the excitation of said control field exciting winding above substantial saturation of said first-mentioned rotatable member core section for limiting the maximum voltage of said machine to a substantially constant predetermined value above said saturation.

5. A dynamoelectric machine including a stationary member and a rotatable member having a core of magnetic material, means including a non-magnetic spacer in said core for dividing said core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section with magnetically substantially separate stationary core sections over different of said rotatable member core sections, a control field exciting winding arranged to excite said stationary core section over one of said rotatable member core sections, means for substantially neutralizing secondary armature reaction in said machine due to electric current in said rotatable member secondary circuit, and other means including a second field exciting winding for providing a component of excitation to the other of said rotatable member sections for inducing a component of voltage in said rotatable member winding variable with and substantially equal and opposite to the component of voltage produced at said secondary brushes by the excitation of said control field exciting winding above substantial saturation of said first-mentioned rotatable member core section for providing a substantially predetermined maximum voltage to said machine.

6. A dynamoelectric machine including a stationary member and a rotatable member having a core of magnetic material, means for dividing said rotatable member core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section with magnetically substantially separate stationary core sections over different of said rotatable member core sections, a control field exciting winding arranged to excite said stationary core section over one of said rotatable member core sections, means including a second field exciting winding for substantially neutralizing secondary armature reaction in said machine due to electric current in said rotatable member secondary circuit, means including a third field exciting winding for providing a component of excitation to the other of said rotatable member sections for inducing a component of voltage in said rotatable member winding in opposition to the component of voltage produced at said secondary brushes by the excitation provided by said control field exciting winding to said one section for providing a substantially predetermined maximum voltage to said machine, and means including a fourth field exciting winding for substantially neutralizing primary armature reaction in the other of said rotatable member sections.

7. A dynamoelectric machine including a stationary member and a rotatable member having a core of magnetic material, means for dividing said rotatable member core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section, a control field exciting winding arranged to excite said stationary core section over one of said rotatable member core sections, means including a second field exciting winding connected in said secondary circuit for substantially neutralizing secondary armature reaction in said control stationary core section due to electric current in said rotatable member secondary circuit, and means including a third field exciting winding energized by the voltage of said machine and connected in series with a non-linear inverse voltage-resistance characteristic resistance for providing a component of excitation to the other of said rotatable member sections for inducing a component of voltage in said rotatable member in opposition to the component of voltage produced at said secondary brushes by the excitation provided by said control field exciting winding to said one section for providing a substantially predetermined maximum voltage to said machine.

8. A dynamoelectric machine including a stationary member and a rotatable member having a core of magnetic material, means including a non-magnetic spacer in said core for dividing said core into a pair of magnetic substantially separate sections, a winding in said rotatable member core, a commutator connected to said winding, means including a set of primary brushes and a set of secondary brushes displaced about said commutator from said primary brushes for providing a primary circuit and a secondary circuit respectively through said rotatable member winding, said stationary member including magnetic core sections for providing exciting poles to said machine over each rotatable member core section with magnetically substantially separate stationary core sections over different of said rotatable member core sections forming two substantially separate magnetic circuits, means including a control field exciting winding arranged to excite said stationary core section over one of said rotatable member core sections for exciting one of said magnetic circuits, means for substantially neutralizing secondary armature reaction in both of said magnetic circuits due to electric current in said rotatable member secondary circuit, means including a field exciting winding connected across said primary brushes for substantially nuetralizing primary armature reaction in the other of said magnetic circuits, and means for providing a component of excitation to the other of said magnetic circuits for inducing a component of voltage in said rotatable member winding in opposition to the component of voltage produced at said secondary brushes by the excitation provided by said control field exciting winding for providing a substantially constant predetermined maximum voltage to said machine.

FREMONT FELIX.
ADOLPH C. HUGIN.